United States Patent
Abigail

(10) Patent No.: US 7,889,669 B2
(45) Date of Patent: Feb. 15, 2011

(54) EQUALIZED NETWORK LATENCY FOR MULTI-PLAYER GAMING

(75) Inventor: Shawn Gregory Abigail, Kanata (CA)

(73) Assignee: Alcatel Lucent, Paris (FR)

( * ) Notice: Subject to any disclaimer, the term of this patent is extended or adjusted under 35 U.S.C. 154(b) by 1458 days.

(21) Appl. No.: 11/234,169

(22) Filed: Sep. 26, 2005

(65) Prior Publication Data

US 2007/0070914 A1 Mar. 29, 2007

(51) Int. Cl.
*G01R 31/08* (2006.01)
*H04J 3/06* (2006.01)

(52) U.S. Cl. .................. 370/252; 370/241; 370/229; 370/465; 370/503; 725/88; 725/102; 725/135; 463/42

(58) Field of Classification Search .................. 370/241, 370/252, 229, 230, 235, 237, 465, 503, 395.21, 370/508, 519, 238, 396; 716/16, 18, 6; 463/41, 463/42; 348/13; 725/88, 102, 135, 80, 100
See application file for complete search history.

(56) References Cited

U.S. PATENT DOCUMENTS

| | | | |
|---|---|---|---|
| 5,777,988 A * | 7/1998 | Cisneros ..................... 370/238 |
| 5,820,463 A * | 10/1998 | O'Callaghan ................ 463/42 |
| 6,111,881 A | 8/2000 | Soncodi | |
| 6,594,235 B1 * | 7/2003 | Rochberger et al. ......... 370/238 |
| 6,886,152 B1 * | 4/2005 | Kong ........................... 716/16 |
| 6,993,671 B2 * | 1/2006 | Pricer et al. .................. 713/400 |
| 2002/0107040 A1 * | 8/2002 | Crandall et al. ............. 455/517 |
| 2003/0164084 A1 | 9/2003 | Redmann et al. | |
| 2004/0087371 A1 * | 5/2004 | Yamana et al. ................ 463/42 |
| 2005/0177855 A1 * | 8/2005 | Maynard et al. .............. 725/88 |

FOREIGN PATENT DOCUMENTS

EP 1086731 3/2001

* cited by examiner

*Primary Examiner*—Aung S Moe
*Assistant Examiner*—Jamal Javaid
(74) *Attorney, Agent, or Firm*—Kramer & Amado, P.C.

(57) ABSTRACT

A method is provided for equalizing latency among a group of connections that are being used by the same latency-sensitive application, such as for multi-player network gaming. Delay is added to the packet flow in each connection as necessary at the provider edge router connecting the application server to the network. An NMS connected to the provider edge router continuously monitors the round-trip delay of each connection, determines the additional delay of each connection required to equalize the delays, and informs the provider edge router. The provider edge router buffers traffic on each connection for the respective duration as indicated by the NMS. The NMS may also reroute some of the connections over higher latency resources to reduce the amount of buffering required, which provides the additional advantage of using what might otherwise be less used or economically less valued resources.

14 Claims, 2 Drawing Sheets

EQUALIZED NETWORK LATENCY FOR MULTI-PLAYER GAMING

FIELD OF THE INVENTION

The invention relates to latency of traffic in packet networks, and more particularly to equalizing latency in end-to-end connections.

BACKGROUND OF THE INVENTION

In packet communication networks, latency arises on a connection as a result of the finite travel time of packets from one end of the connection to the other end. In real time applications, such as voice calls or videoconferencing, it is important to minimize the latency of the connection in order that the end users perceive as little delay as possible in traffic. Minimization of latency is less important for non-real time applications, such as e-mail, but is usually desirable.

In applications involving multiple users, such as multi-player network gaming, differences in latency between the connections of each user can have an impact on the application. For example, in a multiple-player network game requiring simultaneous actions by the players interacting in a shared virtual world, a player whose connection has a latency lower than that of the other players may provide an unfair advantage, as the player is informed of changes in the virtual world ahead of other players, and is able to react to those changes before other players can do so.

While reducing latency in multi-user applications remains important, in some applications it may be still more important to ensure that the latency of each user is equalized. A system which equalized latency of multiple users would allow such applications to run more effectively and, in the case of network gaming, more fairly.

SUMMARY OF THE INVENTION

In accordance with one aspect of the invention, a method is provided for reducing latency disparity between a plurality of connections accessing a server through a network. The inherent latency of each connection is determined. An imposed latency is determined for each connection, each imposed latency being the difference between the inherent latency of the respective connection and the inherent latency of the connection having the largest inherent latency. Packets for each connection are buffered for a duration of time equal to the imposed latency of the connection. In one embodiment, a new route is determined for at least one of the connections, each new route having an inherent latency greater than the initial inherent latency of the connection. For each such new route, the respective connection is re-established along the new route.

In accordance with another aspect of the invention, a method is provided for reducing latency disparity between a plurality of connections accessing a server through a network. The inherent latency of each connection is determined. A new route is determined for at least one connection, each new route having an inherent latency greater than the initial inherent latency of the connection. For each such new route, the respective connection is re-established along the new route.

A system, in the form of network elements and Network Management Software, is provided for carrying out the methods of the invention. The methods may be stored as instructions on computer-readable media.

The methods and apparatus of the present invention allow a service provider to offer a premium gaming service to end-users and gaming service providers.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
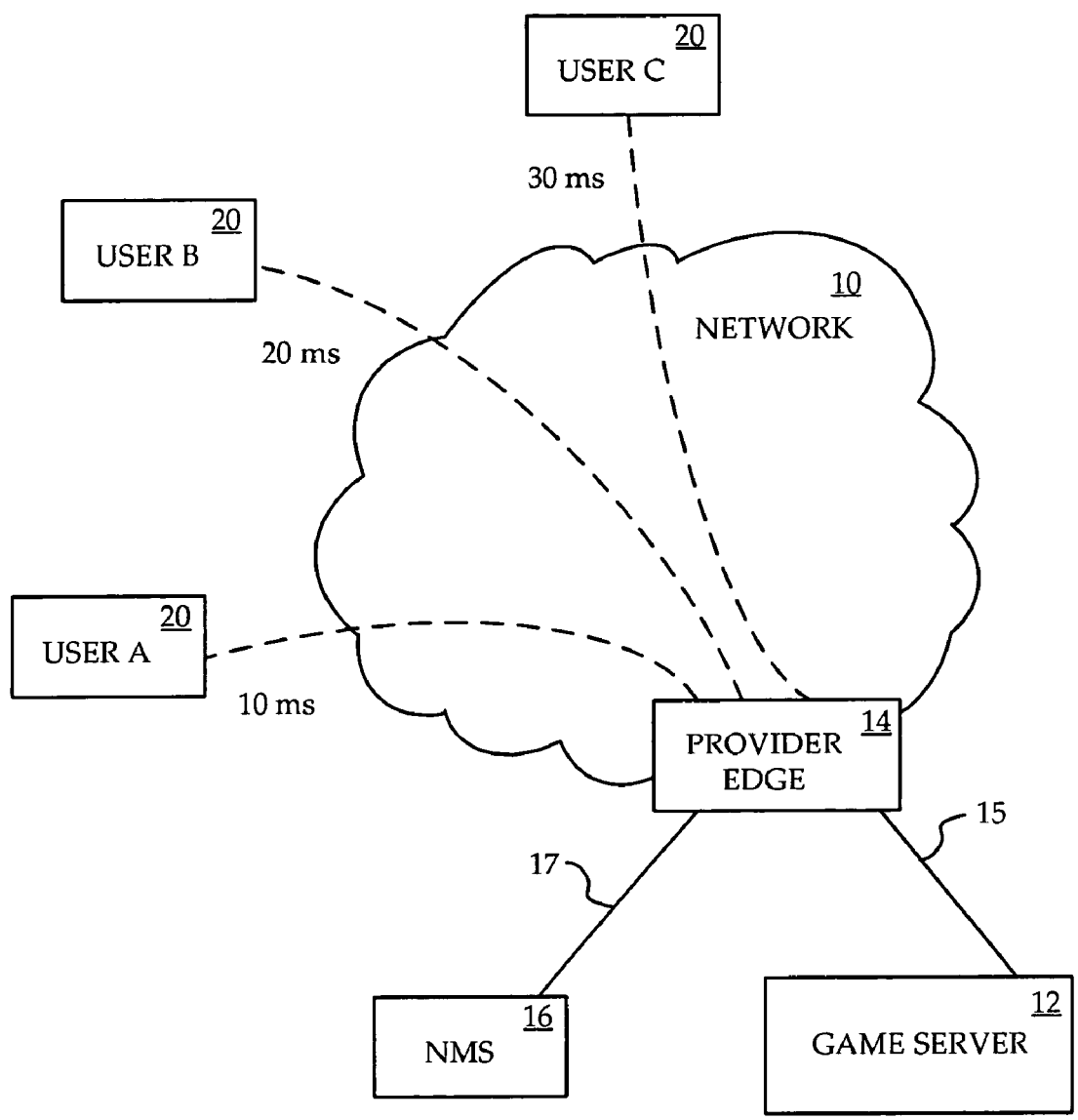
FIG. 1 is a diagram of an example packet communication network in which the invention is implemented.

Referring to FIG. 1, an example packet communication network is shown. The network includes a service provider network 10 operated by a service provider. A game server 12, operated by a game service provider, communicates with the service provider network 10 through a provider edge (PE) 14, operated by the service provider, over a game server channel 15. A network management system (NMS) 16 manages the PE 14 over an NMS channel 17. A plurality of end user devices 20 are connected to the game server 12 through the service provider network 10 and through the PE 14. Although three end user devices A, B, and C are shown in FIG. 1, in general there are a plurality of end user devices, each operated by a user. The invention will be described using three users as an example.

Each end user device 20 has a respective connection to the PE 14, shown as dashed lines in FIG. 1. Although shown as following a bidirectional path, traffic between a particular end user device and the PE may follow different routes in each direction. Each connection has an associated latency, which is a measure of the roundtrip delay between the PE and the end user device of the connection. In the example network of FIG. 1, the connection of user A has a latency of 10 ms, the connection of user B has a latency of 20 ms, and the connection of user C has a latency of 30 ms. Each end user device 20 communicates with the game server 12 over the respective connection to the PE 14 and over a respective connection (not shown) between the PE 14 and the game server 12.

As each user registers for a session on the game server 12, the game server informs the NMS 16 of an identification of the connection for the user. Thereafter, the NMS attempts to equalize the latency of the connection of each of the users registered for the session.

Figure 2:
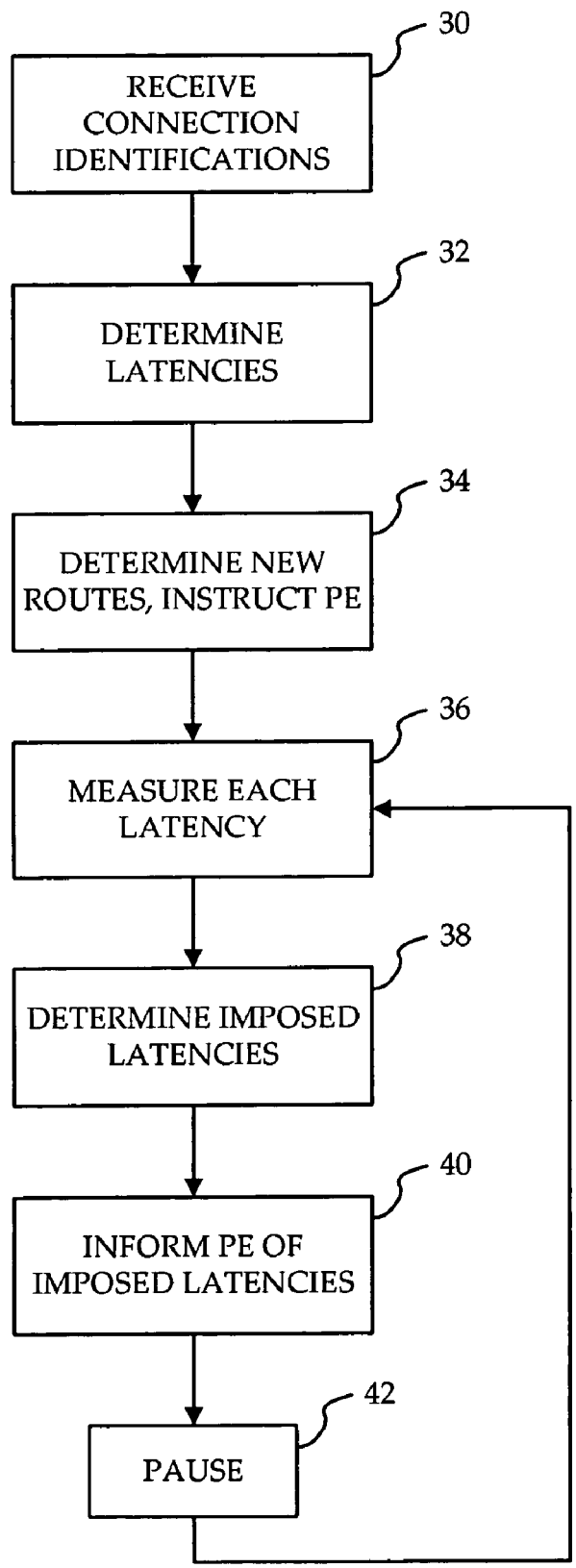
FIG. 2 is a flowchart of a method carried out by the NMS of FIG. 1 according to one embodiment of the invention.

Referring to FIG. 2, a method by which the NMS equalizes the latency of each connection for a session according to one embodiment of the invention is shown. At step 30 the NMS receives the identification of each connection registered for the session. The identifications may be in any form which allows the connections to be identified as being for the session, each connection having a unique identification for the session. As an example, each connection identification could comprise a destination port address on the game server and a source address of the respective user. The destination port address indicates that this connection is for the particular session, and the source address identifies the particular connection.

At step 32 the NMS determines an initial inherent latency of each of the connections. The inherent latency of a connection is the roundtrip delay of a packet when no deliberate latency is introduced by the methods of this invention. The inherent latency may be determined by any of a number of known methods. For example, the NMS may instruct the PE to ping each of the end user devices to determine the inherent latency of the respective connection. Once the NMS knows the inherent latency of each connection, the NMS determines the largest inherent latency of the connections and designates this largest inherent latency as a target latency.

At step 34 the NMS attempts to reroute connections over routes having larger inherent latencies such that the inherent latency of each connection approaches the target latency. For each connection, the NMS uses its knowledge of the network to attempt to select a new route having an inherent latency which the NMS suspects will be larger than that of the original route but preferably not greater than the target latency, for example by considering metrics of each hop along a route. It is of course possible that no such new route exists or can be determined for a particular end user device, in which case no new route is selected for that connection. A threshold is preferably used to reduce re-route attempts, such that the NMS only attempts to select a new route for connections whose inherent latency is lower than the target latency by an amount equal to or greater than the threshold.

Once the new route is selected, the NMS instructs the PE to re-establish the connection along the new route. For the connection whose original route has the largest latency, equal to the target latency, no new connection is determined.

At step 36 the NMS determines the inherent latency of each of the connections and determines the target latency, as described above with reference to step 32, as the inherent latencies may change over time and because some connections may have new routes established at step 34. At step 38 the NMS determines an imposed latency for each connection. The imposed latency of a connection is the difference between the target latency and the inherent latency of the connection.

At step 40 the NMS informs the PE of the imposed latency of each connection. At step 42 the method pauses for a brief time, for example two seconds. The NMS then measures each inherent latency again at step 36, as the inherent latencies of the connections may have changed during the pause.

The NMS may terminate the method at any point that the session ends. Examples of termination are if the game server signals to the NMS that the session has ended, or if no connections remain at step 36.

The PE maintains a buffer for each connection, and maintains the values of the imposed latencies received from the NMS. When the PE receives a packet for one of the connections, the PE places the packet in the buffer associated with the connection. Each buffer has a delay in servicing the packets. When the PE receives the imposed latencies from the NMS, the PE sets the delay of each buffer to be equal to the imposed latency of the connection associated with the buffer. The imposed latency of the connection having the largest latency will be 0, as the connection will have an inherent latency equal to the target latency. Turning to the example network shown in FIG. 1, the PE would initially set the delay of the buffer associated with end user device A to 20 ms, and set the delay of the buffer associated with end user device B to 10 ms.

The PE only places packets traveling in one direction in the buffer, because the imposed latency is determined in order to equalize roundtrip latency. The PE may place packets traveling to the game server in the respective buffer, or packets traveling to the end user devices in the respective buffer, but should not do both. Alternatively, the PE may set the delay of each buffer equal to half the imposed latency for the respective connection, in which case the PE places packets traveling in both directions in buffers.

The invention has been described in which both rerouting and buffers are used to equalize the latency of connections. This allows the latency of connections to be equalized coarsely using rerouting, and the latency equalization to be fine-tuned using buffers. The NMS can use what may otherwise be underutilized high latency routes as a first approximation at equalization of latency and then use smaller buffers for fine-tuning and for dynamic adjustment. Alternatively, either buffering alone or rerouting alone could be used. Using only buffers also allows straightforward implementation in connectionless-oriented networks. However, using only buffers generally requires the use of more buffer space, which is expensive. Using only rerouting to higher latency routes will generally not provide the same degree of equalization. In addition, if dynamic adjustment were desired rerouting in mid-session would be required, which may cause noticeable interruptions to the end users.

The invention has been described in which buffers are maintained by the PE. Alternatively, buffers may be maintained and imposed latencies determined at other control points such as the end user devices (such as cable modems, DSL modems, or third party hardware attachments) or the game server. In a further embodiment of the invention, a buffer could be maintained by a specific software application, such as a latency equalization utility or a component within a game. However, by implementing the invention at the PE and at the NMS, the service provider can offer latency equalization to the operator of the game server while requiring little if any modification to the game server and no modification to the game clients located on the end user devices. Furthermore, placing some functionality on the end user devices exposes the methods of the invention to hacking, which can defeat the advantages of the invention.

The invention has been described with reference to a game server. The invention may also be applied to any application in which latency equalization is desired.

Throughout the description above, the invention has been described with the purpose of equalizing the latency of connections. While latency equalization is the ideal objective of the invention, the methods may more generally, and more realistically, describe attempts at minimizing or reducing latency disparity between connections.

Instructions for carrying out the methods of the invention are preferably in the form of software located on the NMS and PE, or on the end user devices or game server as the case may be, and may be stored on computer-readable media. Alternatively, the instructions may be in the form of hardware, such as in a processor, located on the appropriate network elements, or in any combination of hardware and software.

The embodiments presented are exemplary only and persons skilled in the art would appreciate that variations to the embodiments described above may be made without departing from the spirit of the invention. Methods which are logically equivalent to those described above are still within the scope of the invention. The scope of the invention is solely defined by the appended claims.

I claim:

1. A method of using a network management system (NMS) to reduce a latency disparity between a plurality of connections accessing a server through a provider edge device, wherein the NMS manages the provider edge device, the method comprising:

determining an inherent latency of the plurality of connections with the NMS;

designating a largest inherent latency of the determined inherent latencies as a target latency, wherein dynamic adjustment of the target latency occurs;

for the plurality of connections, attempting to reroute a connection when an original connection has an initial inherent latency lower than the target latency by an amount equal to or greater than a threshold;

for each rerouting attempt, selecting a new route having a new latency greater than the initial inherent latency of the original connection;

for each new route, reestablishing the original connection along the new route, thereby creating a new connection; and determining a new inherent latency of each new connection.

2. The method of claim 1, further comprising:

determining an imposed latency for each new connection, each imposed latency being a difference between the new inherent latency of the new connection and the target latency; and buffering packets for each new connection for a duration of time equal to the imposed latency of the new connection.

3. The method of claim 2, wherein determining the new inherent latency and determining the imposed latency are repeated at intervals, whereby the duration for which packets are buffered for a new connection may vary with time.

4. The method of claim 3, wherein determining the new inherent latency of each new connection further comprises:

determining a round trip delay between an end user device of the new connection and the provider edge device through which the server accesses the network.

5. The method of claim 4, wherein determining the round trip delay further comprises:

the provider edge device pinging the end user device of the new connection.

6. The method of claim 2, further comprising:

using rerouting to perform coarse equalization of latencies; and using buffering to perform fine equalization of latencies.

7. The method of claim 2, further comprising:

informing the provider edge device of the imposed latency for each new connection with the NMS.

8. The method of claim 7, further comprising:

maintaining, in the provider edge device, values of the imposed latencies.

9. The method of claim 7, further comprising:

placing, with the provider edge device, packets traveling from each connection to the server, in a buffer having a delay equal to the imposed latency.

10. The method of claim 7, further comprising:

placing, with the provider edge device, packets traveling from the server to each connection, in a buffer having a delay equal to the imposed latency.

11. The method of claim 7, further comprising:

placing, with the provider edge device, all packets traveling between the server and each connection, in a buffer having a delay equal to half of the imposed latency.

12. The method of claim 1, wherein determining the new inherent latency of each new connection further comprises:

determining a round trip delay between an end user device of the new connection and the provider edge device through which the server accesses the network.

13. The method of claim 12, wherein determining the round trip delay further comprises:

the provider edge device pinging the end user device of the new connection.

14. The method of claim 1, further comprising:

using rerouting to perform coarse equalization of latencies; and using buffering to perform fine equalization of latencies.

* * * * *